Sept. 6, 1927.
K. R. MANVILLE
VIBRATION DAMPENER
Filed May 5, 1926
1,641,230
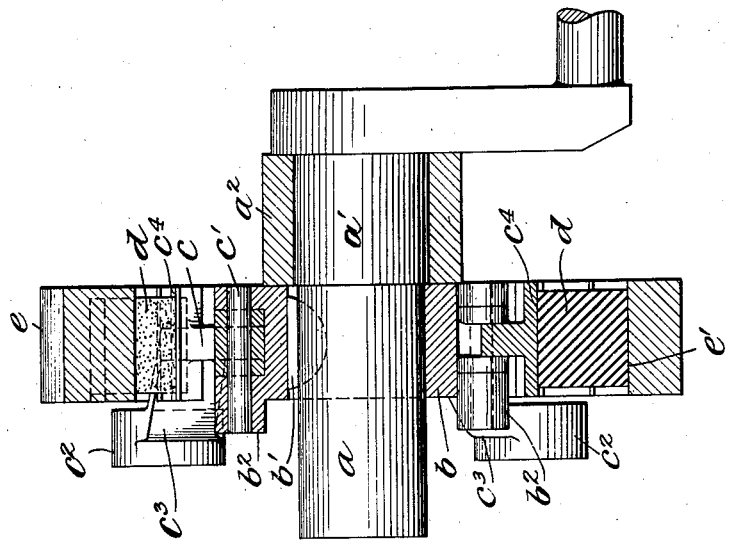
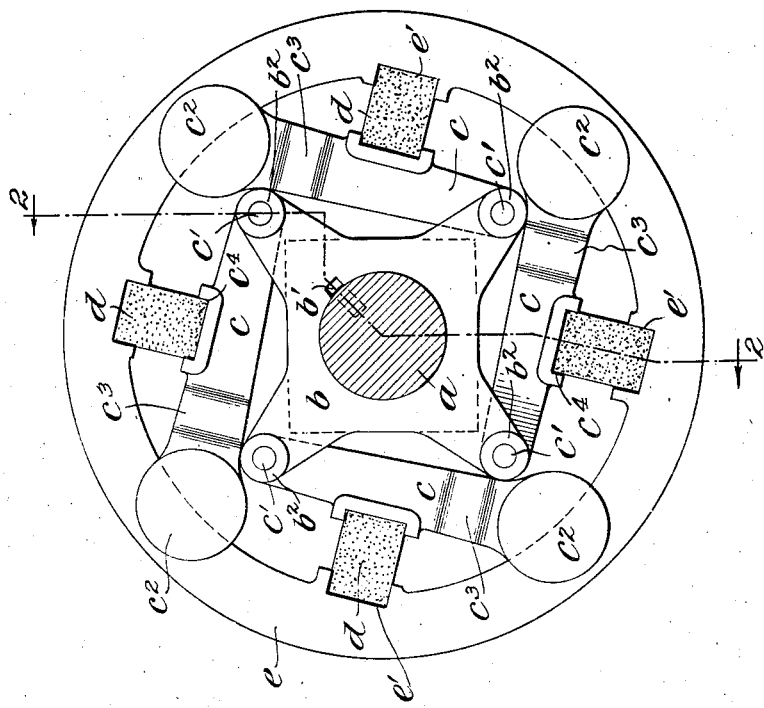
Inventor
Keith R. Manville
By his Attorneys
Redding, Greeley, O'Shea & Campbell Patented Sept. 6, 1927.

1,641,230

UNITED STATES PATENT OFFICE.

KEITH R. MANVILLE, OF NEW YORK, N. Y., ASSIGNOR TO INTERNATIONAL MOTOR COMPANY, OF NEW YORK, N. Y., A CORPORATION OF DELAWARE.

VIBRATION DAMPENER.

Application filed May 5, 1926. Serial No. 106,807.

The present invention deals with the problems outlined in the patent to Alfred F. Masury, No. 1,627,917, dated May 10, 1927, and assigned to the assignee of this patent. As noted therein, the torsional vibration produced in a crank shaft at its critical speed, which speed is determined by the inherent characteristics of the crank shaft, such as number of cranks, weight, etc. becomes very injurious at the above point and it is highly desirable to prevent the same.

Heretofore, a body mounted with the fly wheel of the shaft has been provided and connected thereto through a friction clutch or restricted fluid path so that any sudden change in speed produced by the above vibrations must first overcome the resistance offered through such condition. In this manner, a structure having one characteristic curve is combined with one having a widely different curve and there results a smoothing out of the performance curve at the critical point or points in question.

The present invention seeks to approach the problem from a different angle and accomplishes a more effective elimination of these points by providing a fly wheel capable of relative rotative motion with respect to and connected to the rotating body by a variable inertia device.

Reference will now be had to the accompanying drawings forming a part hereof for a more detailed description of the device, wherein:—

Figure 1 is a front elevation, partly in section, showing a preferred form of my device.

Figure 2 is a side section taken on the line 2—2 of Figure 1 and looking in the direction of the arrows.

In the drawings, $a$ represents a crank shaft provided with a suitable shoulder $a'$ and collar $a^2$ against which the device may be seated. Upon shaft $a$ is mounted spider $b$, the same being splined thereto as at $b'$. Portions $b^2$ project in a direction parallel to the axis of $a$ and to the spider at such points are pivoted arms $c$, secured by pins $c'$ to the spider.

At their other ends, the arms have inertia elements $c^2$ formed thereon and the arms are offset as at $c^3$ so that the inertia portions are not blocked in their outward movement by the relatively movable fly wheel to be later described. These arms, when at rest, lie on the pivot portions of the spider, being held lightly thereon by means of rubber blocks $d$, the pressure on said blocks being equalized by means of a circumposed fly wheel $e$ capable of relative rotative motion with respect to the body. The wheel and the arms have co-operating seats $e'$ and $c^4$ respectively, which receive the rubber blocks so that a connection of great strength is provided.

In mounting the apparatus the blocks are positioned in the seats under compression whereby their resiliency, strength and wearing qualities are increased.

When the shaft $a$ is rotated, the weights $c^2$ move outwardly against the resistance of the rubber. Sudden changes in speed must overcome the changes of inertia due to the above and in this manner, deleterious vibrations are damped out. Furthermore, the fly wheel smooths out the vibrations previously noted and the result is a highly effective damping device.

Changes in the above structure can be made which fall reasonably within the needs of different installations and the invention is not to be limited except by the appended claims.

What I claim is:

1. A vibration damping device, comprising a rotating member, an element capable of rotative movement with respect to the member, and variable inertia means mounting the former on the latter.

2. A vibration damping device comprising a rotating member having a given vibration characteristic, a member carried thereby having a different characteristic and means for mounting the latter on the former said means including means for varying the vibration characteristic thereof automatically.

3. A vibration damping device comprising a rotating member, a member capable of rotative movement with respect to such member and carried thereby, variable inertia means mounted on the rotating member and non-metallic yielding means carried by the variable inertia means and mounting the second member thereon, whereby the same is mounted on the rotating member.

4. A vibration damping device comprising a rotating member, a spider carried thereby, variable inertia elements pivoted thereto, a member capable of rotative movement with respect to the first member, and means connecting the same to the variable elements, whereby said member is mounted upon the rotating member.

5. A vibration damping device comprising a rotating member, a spider carried thereby, variable inertia elements pivoted thereto, a fly wheel capable of rotative movement with respect to the first member and yielding non-metallic means mounting the same on the inertia elements whereby the fly wheel is mounted on the rotating member.

6. A vibration damping device comprising a rotating member, a spider carried thereby, a plurality of variable inertia means pivoted on the latter, seats on the inertia means, a fly wheel capable of rotative movement with respect to the first member, seats thereon co-operating with the first named seats, and non-metallic yielding means disposed between the seats under compression, said inertia means resting on a pivot point of an adjacent means when the rotating member is at rest.

This specification signed this 27th day of April A. D. 1926.

KEITH R. MANVILLE.